Oct. 13, 1964   O. A. FISCHER   3,152,862
PROCESS FOR TREATING URANIUM-CONTAINING OXIDE ORES
Filed Nov. 23, 1960

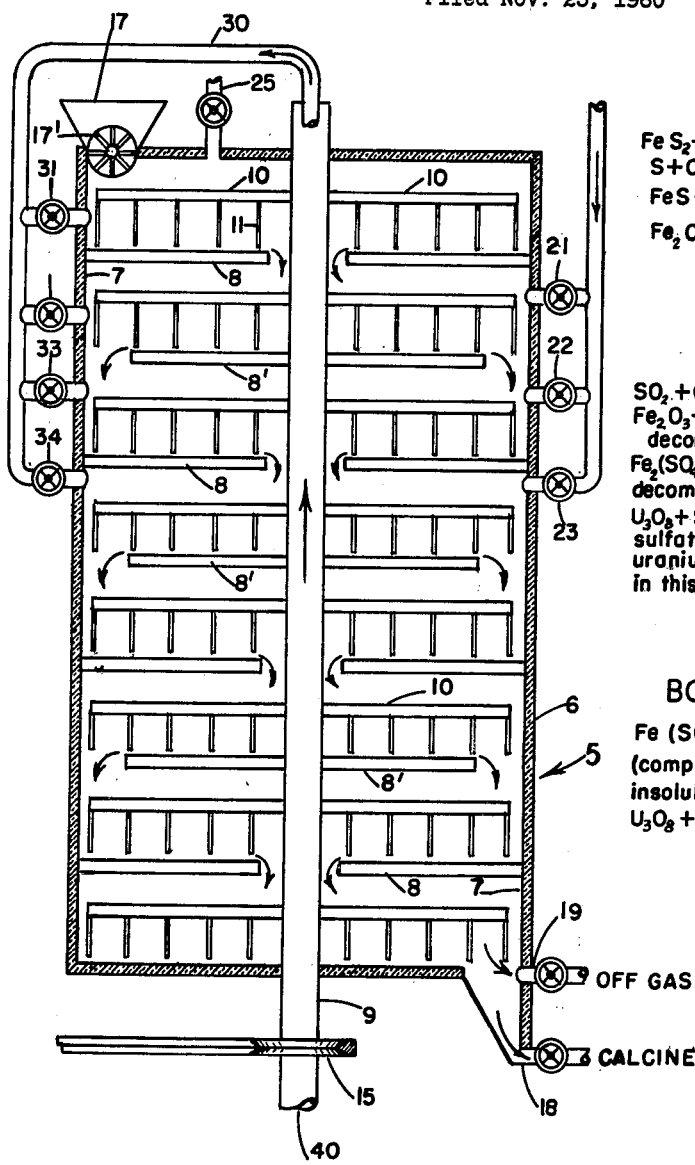

UPPER ZONE $FeS_2 + Heat = FeS + S$
$S + O_2 = SO_2$
$FeS + 7O_2 = Fe_2O_3 + 4SO_2$
$Fe_2O_3 + SO_2 + O = Fe_2O_3 + SO_2$

MIDDLE ZONE $SO_2 + O + Fe_2O_3 (Catalysis) = SO_3$
$Fe_2O_3 + 3SO_3 = Fe_2(SO_4)_3$ below decomposition temperature
$Fe_2(SO_4)_3 + Heat = Fe_2O_3 + SO_3$ above decomposition temperature
$U_3O_8 + SO_3 =$ soluble uranium sulfate. A partial amount of uranium is converted to a sulfate in this zone.

BOTTOM ZONE $Fe(SO_4)_3 + Heat = Fe_2O_3 + SO_3$ (completed) rendering the iron insoluble.
$U_3O_8 + SO_3 =$ soluble uranium sulfate

*INVENTOR.*
OSCAR A. FISCHER
BY
ATTORNEYS

United States Patent Office 3,152,862
Patented Oct. 13, 1964

3,152,862
PROCESS FOR TREATING URANIUM-CONTAINING OXIDE ORES
Oscar A. Fischer, Denver, Colo.
(Apartado 140, Pachuca, Hidalgo, Mexico)
Filed Nov. 23, 1960, Ser. No. 71,183
16 Claims. (Cl. 23—14.5)

This invention relates to a process for treating uranium-containing oxide ores or compounds to form water soluble uranium sulfate, and more particularly to a process of treating uranium-containing pitchblende ores to obtain a water soluble uranium salt.

This application is a continuation-in-part of application Serial No. 635,145, filed January 22, 1957, now abandoned, and is related to application Serial No. 753,141, filed August 4, 1958, now abandoned, both by the same inventor.

In practices of the prior art, uranium-containing oxide ores have been converted to sulfates by leaching or baking or heating with sulfuric acid, and recovering the resulting sulfates from either the solution or residue. Prior art practices of treating uranium oxide ores, such as uranium-containing pitchblende ore, have not proven suitably accomplishable by such acid processes because of large amounts of naturally occurring lime which require large quantities of acid for neutralization. The most common commercially used prior art process for treating uranium-containing pitchblende ores has been primarily the "Cotter" type alkaline process.

However, such prior art practices have proven costly, in the case of the acid process, in the amount of acid consumed and because the operation required acid resistant equipment; and in the case of the "Cotter" process because of expensive and extensive equipment installations and relatively low recoveries of uranium content from the ores being treated. Also, the Cotter process required on the order of four days to complete treatment of an ore charge.

I have discovered, contrary to the teachings of the prior art, that excessive acid costs may be eliminated by utilizing a treatment in which sulfur-bearing compounds, particularly anhydrous metallic sulfides, are present in a quantity sufficient to serve in a catalytic manner to convert the desired uranium oxide content of such pitchblende ores to a soluble sulfate compound.

Such a conversion is most effectively performed in a roasting operation performed in a concurrent or gas circulating type furnace. The aforesaid mixture of anhydrous metallic sulfide and uranium-containing pitchblende ore is subject to such a roast with or without continued application of extraneous heat, at gradually increasing temperatures to a maximum temperature slightly above the decomposition temperature of the selected anhydrous metallic sulfide. The exothermic characteristics obviate the need for extraneous heating in many operations.

Such a treatment does not require the use of costly acid-resistant equipment and may utilize relatively inexpensive materials such is iron pyrite, which is my preferred anhydrous metallic sulfide and which is usually available in large quantity at relatively low cost at the sites of such roasting operations. Also, my process requires only about one day (24 hours) to complete treatment of a given charge of ore.

A conversion according to my concepts affords the further benefit of such a high percentage of extraction of valuable constituents of such as uranium-containing pitchblende that the subsequent treatment for final separation and recovery is quite economical and highly efficient as shall become apparent hereafter.

Furthermore, it is possible in using my process for beneficiating uranium-containing pitchblende ores to provide for purification of the final product by removing extraneous, adulterative metallic sulfates and sulfides with the residue of the roast treatment. This is done by suitable control of temperature by which the adulterous metallic compounds are converted to oxides which are insoluble in subsequent water leaching treatments.

In some environments I have found that the inclusion of a quantity of an alkaline chloride, preferably sodium chloride, catalytically assists the anhydrous metallic sulfide to more readily sulfatize the uranium content of the ore being treated.

Accordingly, it is an object of my invention to provide a simple, efficient and economical process for the conversion of uranium oxide containing ores or compounds to water soluble sulfates which are adapted for subsequent recovery of the valuable constituents from the roast calcine by well-known methods such as water leaching.

Another object of my invention is to provide a process for converting uranium oxide-containing pitchblende ores or compounds to sulfates, in which the amount of sulfur-bearing compound used in the conversion is proportioned to the quantity of sulfate to be formed, and to the heat input.

It is a still further object of my invention to provide a roasting process for conversion of the uranium oxide content of uranium-containing pitchblende ores to water soluble sulfates, in which substantial amounts of sulfur dioxide are evolved and converted to a nascent state in a bed reaction including the conversion thereof to "instant" sulfur trioxide which is evolved in the nascent state during the progress of the roast.

It is still another object of my invention to provide a roasting process to convert the uranium oxide content of uranium-containing pitchblende ores to a water soluble sulfate form which is adapted for simple and inexpensive subsequent recovery of valuable constituents by well-known methods; and including a teaching of forming catalytically active material for improving the degree of recovery.

It is a still further object of my invention to provide a process for the purification of the desired soluble uranium sulfate product by providing for the conversion of adulterous foreign metallic elements in the ore charge to water insoluble oxide forms.

While my process may be utilized effectively with a variety of oxide ores or compounds, it is particularly effective, as noted above, for converting the uranium oxide content of uranium-containing pitchblende ores.

The practice of the invention will be best understood by the discussion of a typical treatment operation. The uranium content of the ore was about 2.59% $U_3O_8$ with only a small amount of naturally occurring iron pyrite. Sufficient pyrite was added to amount to about 10% by weight. The mixture was subjected to a concurrent roast for about four hours with gradually increasing temperatures through three operating stages or zones. In order to approximate commercial conditions in such a concurrent roast, about 1½% by weight of $SO_2$ gas was passed over the mixture. The calcine was dissolved in water with the following results:

|  | Percent |
| --- | --- |
| Water soluble $U_3O_8$ | 2.427—93.7 extraction. |
| 5% acid soluble $U_3O_8$ | .084 |
| Leached calcine (residue) $U_3O_8$ | .079 |
|  | 2.590 |

In the aforesaid roasting treatment, the roast temperature was gradually increased through three operating stages. In the first stage, the temperature was gradually increased to approximately 480° C. In this first stage, the iron pyrite was converted to a catalytically active oxide form, and the sulfur and oxygen portions thereof, in combination with the commercial $SO_2$ gas added, were converted to $SO_3$ gas.

During the evolution and gradual increase in temperature in the first stage, close and intimate contact was maintained through the ore charge. This close and intimate contact was aided by mechanical rabbling in order to approximate the conditions of a moving bed since it has been found that the reactions occurring best take place throughout the ore charge when treated as a moving bed.

After the foregoing gradual increase to 480° C. of the ore charge (with continued rabbling to maintain conditions approximating those of a moving bed) the temperature was further gradually increased to approximately 600° C., which is slightly above the decomposition temperature of the iron sulfates formed from the contained pyrites.

During the foregoing gradual increase to 600° C. a substantial amount of the uranium oxide in the ore charge was converted to a soluble sulfate form. At the same time there was a gradual though substantial decrease in any sulfates which decompose below 600° C. Also, during this second stage treatment, nascent gas which had been previously evolved, and that which was continuing to evolve, was contained in the above described close and intimate contact throughout the ore charge and in contact with the individual particles of the ore charge.

The result of the foregoing stages produced a soluble uranium sulfate which could be extracted by leaching. Sometimes it is desirable to extend the time in the second stage to assure complete sulfatization of the uranium oxide and be assured that the undesired sulfates in the roast are completely decomposed.

After the last stage, the charge was removed from the roasting vessel and passed to a leaching operation in which the soluble uranium sulfate went into solution and the adulterous insoluble oxides, etc., passed off with the insoluble residue.

In the above described process, in the upper zone or first stage, the following chemical equations indicate the various chemical reactions which occur:

(1) $FeS_2 = S + FeS$
(2) $S + O_2 = SO_2$
(3) $4FeS + 7O_2 = 2Fe_2O_3 + 4SO_2$
(4) $Fe_2O_3 + SO_2 + O = Fe_2O_3 + SO_3$ (catalysis)
(5) $Fe_2O_3 + 3SO_3 = Fe_2(SO_4)_3$ (when the mix is below the decomposition temperature of $Fe_2(SO_4)_3$)
(6) $Fe_2(SO_4)_3 + heat = Fe_2O_3 + 3SO_3$ (above the decomposition temperature of $Fe_2(SO_4)_3$)

In the middle zone or second stage, the evolved "nascent gas," which is a combination of evolved $SO_2$ and $SO_3$ gas, passes through the voids and openings in the charge and in close and intimate contact with the particulate constituents of the ore. During this close and intimate contact, a substantial amount of the uranium oxide is converted to a soluble sulfate form according to the following general equations:

(7) $U_3O_8 + SO_2 + O =$ soluble uranium sulfate
 (in the presence of $Fe_2O_3$, the catalyst)
 $U_3O_8 + SO_3 =$ soluble uranium.
(8) $U_3O_8 + (SO_2$ or $SO_3) =$ soluble uranium sulfate.

In the use of the word "nascent," I am actually concerned with $SO_3$ and not $SO_2$. However, "nascent gas" is meant to describe the instant the $SO_3$ is formed from the $SO_2$. This "instant" $SO_3$, formed from $SO_2$ and from the decomposition of $Fe_2(SO_4)_3$ has been found to be more active than introducing a commercially available $SO_3$ gas alone.

By the foregoing I do not mean to state that $SO_3$ will not sulfatize mineral, since that would be erroneous, it will: but not as effectively as the nascent gas I am describing herein. Therefore, it is my aim to produce as much as possible of this nascent gas in intimate contact with the constituents of the ore charge upon the instant of its formation.

The following is a typical analysis of uranium containing pitchblende ore of the type amenable to treatment by my process:

| | Percent by weight |
|---|---|
| Iron (Fe) | 10.65 |
| Alumina ($Al_2O_3$) | 12.63 |
| Manganese (Mn) | 0.87 |
| Calcium (as $CaCO_3$) | 5.60 |
| Magnesia (MgO) | 1.08 |
| Sodium (as $Na_2O$) | 1.17 |
| Potassium (as $K_2O$) | 2.68 |
| Sulfur (S) | 1.65 |
| Uranium (as $U_3O_8$) | 0.643 |
| Copper | 0.20 |
| Silica ($SiO_2$) | 52.78 |
| Loss on ignition | 9.08 |
| Trace elements | 0.967 |
| | 100.000 |

The trace elements include gold, silver, arsenic, antimony, lead, bismuth, zinc, phosphorus, zirconium, and rare earth oxides.

To further illustrate my process, the mineral entering the furnace or other roasting chamber has been reduced (which need be only to about 60 mesh) and is naturally inclusive of voids filled with air. In one of its aspects, I add a sulfide mineral, usually pyrite, to the ore charge. In another aspect, the ore contains enough naturally occurring metallic sulfide for the process.

In a first zone, the heat is gradually increased to form an oxide of the metallic sulfide, and evolve $SO_2$ gas. The sulfide is decomposed from contact with air, not only in the voids throughout the ore charge, but also from air which may be introduced into the roasting chamber. This decomposition evolves an $SO_2$ gas, and by regulation of heat and air, the iron oxide formed by the decomposition, serves as a catalyzer to cause evolution of $SO_3$ from air, and $SO_2$. At the moment the $SO_3$ is formed, it is nascent and attacks the mineral to be sulfatized with more vigor than results from the mere introduction of $SO_3$ or any which had previously been formed.

As mentioned above, for the catalytic formation of $SO_3$ gas, conditions must be favorable. Since most minerals have a favorable temperature for the formation of a sulfate, they also have a decomposition temperature at which they are decomposed to form an oxide. In the case of iron pyrite, a considerable amount of iron sulfate is formed at a relatively low temperature, a favorable condition in the first stage, whereas when the temperature is raised to above the decomposition temperature of the iron sulfate a less favorable first stage condition is established, which will be apparent hereafter. When this iron sulfate decomposes, it forms an iron oxide and $SO_3$. Here again I have a nascent gas.

From the foregoing, it is obvious that nascent gas formation in the bed is accomplished from two sources. First from the decomposition of iron sulfate and secondly from the decomposition of the iron pyrite. Expressing the foregoing in general equation form:

(9) From $SO_2$ and air (oxygen) in the presence of iron oxide formed in the roast and acting as a catalyst = instant $SO_3$.
(10) From the decomposition of iron sulfate having a lower decomposition temperature than the desired sulfate (namely the desired uranium sulfate) + heat = instant $SO_3$.

Any type of furnace which embodies continuous rabbling or allows for the flowing of an ore charge as a moving bed, and in which the temperature and air can be controlled, may be employed in the treatment. However, in any case, it must direct the nascent gas which attacks the ore in the bed in the same direction as the ore travel, i.e., concurrent flow between nascent gas and the ore charge. This is true since I have only been able to obtain the progressive formation of nascent $SO_3$ gas in concurrent flow. The reverse would be true in a countercurrent roast in which case any nascent $SO_3$ gas formed would be reduced as it came in contact with a sulfide such as iron pyrite.

In actual practice, the necessary amount of anhydrous metallic sulfide, such as iron pyrite, to be added, is dependent upon the sulfate to be formed and the quantity of heat necessary to reach the desired temperature for conversion of the uranium oxide to uranium sulfate. The quantity of anhydrous metallic sulfide to be added may also control the quantity of heat necessary to reach the desired temperatures for the necessary decomposition.

In dealing with uranium containing pitchblende ores I have found that about 10% of an anhydrous metallic sulfide, such as iron pyrite, is a preferable amount for the most efficient conversion.

As described above, experiments have demonstrated that the nascent gas formed either by catalysis or the decomposition of $Fe_2(SO_4)_3$, as above described, is far more active in the roast than passing $SO_3$ or vaporized $H_2SO_4$ over the oxidized ore under the same heat conditions. This is undoubtedly due to the fact that it is primarily a bed reaction and at the instant of conversion of $SO_2$ to $SO_3$ the latter is more powerful and in a nascent state.

Precautions must be taken in the formation of the catalyzer $Fe_2O_3$ from the pyrite to obtain the greatest catalytic activity. A quick, high temperature roast is not conducive to obtaining a good catalyst since it apparently "poisons" the iron oxide.

Also, in the illustrations given above, it must not be assumed that each reaction is separate and distinct in any part of the furnace. For instance, should any $SO_3$ come in contact with a sulfide particle, the sulfide will be oxidized and the $SO_3$ reduced to $SO_2$. However, these reactions are continuous so that $SO_3$ is constantly being reformed until it reacts with uranium oxide to form water soluble uranium sulfate.

Many features and advantages, other than those discussed above, will become apparent to those skilled in the ore beneficiating art from a study of the detailed description of the appended exemplary drawing which is set forth hereafter. The drawing is a schematic diagram illustrative of a suitable roasting unit used in the practice of my invention and setting forth equations indicative of the main chemical reactions which occur in the various stages of said process.

Before describing the process in detail in relation to said drawing, it is to be understood that I do not desire to be limited by said disclosure but rather that the spirit and scope of my invention be defined by the hereafter set forth claims.

The apparatus shown in the drawing comprises a roaster or furnace 5 of the upright double-walled type having suitable insulation material 6 in the space between said walls. The interior of the roaster is divided or partitioned by a series of vertically spaced decks or hearths 8 and 8' arranged in alternate relation. A rotary hollow shaft 9 extends through the roaster and carries a plurality of rabbles or rakes 10 for conjoint rotation with the shaft, one said rabble being disposed in overhanging relation to each deck with its tines 11 disposed in closely spaced relation to the upper surface of the adjoining deck.

In order to provide for controlled passage of the ore charge through said roaster, the decks 8 are supported from the upright walls of the roaster and have a central opening through which the shaft extends in spaced relation to the deck, providing a passage for the roast to pass by gravity from said deck to the next lower deck 8'. The decks 8' are mounted on shaft 9 and terminate in spaced proximity to the side walls of the roaster. This arrangement permits the ore charge to feed onto the decks 8 near the periphery and discharge therefrom through the central opening as feed to the next lower deck 8'. The roast is moved outwardly on the decks 8' to discharge across the periphery onto the next lower deck 8. These movements provide a continuous tumbling or agitation of the constituents of the bed and thereby form a moving bed.

A sheave 15 mounted on the lower end of shaft 15 is driven by a suitable transmission and prime mover (not shown). Initial feed to the roaster is introduced through a top inlet 17 and the calcine is discharged through a bottom outlet 18, preferably valve controlled, and off gas also discharges through another lower valve controlled outlet 19. Preferably inlet 17 includes a star feeder 17' to maintain gas circulation interiorly of the roaster and also prevents heat losses.

As was discussed above, careful control of temperature is necessary in order that proper regulation of my process may be accomplished. To this end, an air supply line 20 has inlets at spaced intervals extending into the upper zone and controlled by valves 21, 22 and 23. These inlets enter through the roaster walls just below a given deck, approximately in line with the end of its associated rabble and are for the purpose of introducing cold auxiliary air under pressure into the roaster. Another air inlet 25 is located adjacent the feed bin 17 for a similar purpose. A second line 30 has inlets extending through the walls of the roaster and controlled by valves 31, 32, 33 and 34, and is for the purpose of introducing hot auxiliary air into the roaster. This hot auxiliary air is delivered under pressure through the bottom 40 of the hollow shaft 9 and passes up the hollow shaft 9 so as to become heated by the contained heat in the roaster. Although it has not been shown in the drawings, a suitable vacuum system or exhaust fan may be incorporated with the off-gas and/or calcine outlets in order to assure a downward flow of auxiliary air so introduced into the system.

Any suitable type of heating may be utilized in the roaster 5, such as an oil burner, or any other means by which the bed of the ore charge can be raised to its initial first stage temperature. After the bed has reached its initial reaction temperature, it will inherently continue to rise due to the exothermic nature of the chemical reactions occurring. Whenever internal heating is desired to initiate the reaction, or to maintain temperature in any of the zones, burners may be mounted on any of the hearths and supplied from an external source (not shown) with any suitable fuel, such as natural gas, for example. Such practice is common in the roaster art, and as the drawing is intended as schematic only, burner details have not been shown.

Noting the equations to the right of the upper zone, it will be obvious that initial heat is necessary to cause the iron pyrite (or other anhydrous metallic sulfide) to decompose and form FeS and free sulfur. After this initial decomposition, oxygen, which can be either or both that introduced by the auxiliary air system and that which is included in voids throughout the ore charge, will react with the heated free sulfur in an exothermic reaction.

The FeS which was formed in the initial decomposition will further react with still more oxygen to evolve ferric oxide and sulfur dioxide. This reaction, also being an oxidation process, is similarly exothermic. Thus, there is more heat generated in the roaster.

The ferric oxide thus generated is in a catalytically active oxide form and causes the sulfur dioxide evolved by FeS decomposition to react with still more oxygen to form "instant" $SO_3$ gas. It is in this reaction that some of the nascent, highly reactive gas is evolved.

As noted above, the temperature in the first stage is a gradually increasing temperature and this gradual increase is carefully controlled as by use of cold auxiliary air and hot auxiliary air. The upper range or limit for the first stage is the decomposition temperature of iron sulfate which is about 480° C., while the lower limit is the temperature at which decomposition of iron pyrite occurs which is about 167° C.

Since the first stage temperature is a gradually increasing one, the $Fe_2O_3$ from the previous reaction will react with some of the instant $SO_3$ gas formed. The result is iron sulfate, i.e., $Fe_2(SO_4)_3$. As the temperature continues to increase, the so-formed ferric sulfate decomposes to again form a quantity of instant $SO_3$ gas. After the substantially complete decomposition of the iron pyrite, the middle zone is reached.

Continued rabbling of the moving bed of ore across the decks or hearths 8 and 8' results in constant, close and intimate contact between new ore surfaces and the evolving instant $SO_3$ gas. In the second stage, the instant $SO_3$ gas reacts with some of the uranium oxide ($U_3O_8$) to form the desired soluble uranium sulfate product. To enhance the desired formation of uranium sulfate, and overcome the tendency of the iron oxide to reform ferric sulfate, the temperature is increased to slighlty above the decomposition temperature of the ferric sulfate, i.e., about 600° C.

After a suitable period of time, which is dependent (1) on the quantity of iron pyrite added, (2) the temperature, and (3) the quantity of uranium oxide in the ore, a substantial amount of the uranium oxide in the ore charge will have been converted to the desired soluble sulfate product.

The temperature of this third stage must be above the decomposition temperature of the adulterous metallic constituents to be oxidized.

After a suitable period of time in the third or bottom zone, the calcine is removed for treatment in such as a leaching stage wherein the water soluble uranium sulfate is dissolved and separated from the insoluble components of the calcine residue.

Briefly, my preferred process of treating uranium containing pitchblende ores is comprised essentially of reducing a charge of ore to be treated to the order of about 60 mesh and adding a quantity of iron pyrite to the ore. Preferably, sufficient iron pyrite is added to bring the total amount by weight, relative to the charge, to about 10%. The so-formed charge is passed to a first treating stage as a moving bed.

In the first stage, gradually increasing temperatures are applied to the ore charge which is maintained as a moving bed. The temperature range in this first stage will be on the order of from about 167° C. to about 480° C. The increase must be gradual. In the case of the 10% addition, I have found that about the shortest time for best results in the first stage is on the order of about 4 to 8 hours.

The moving bed is passed from the first stage, with concurrent gas flow, into a second stage. The moving bed is subjected in the second stage to a gradually increasing temperature to about 600° C. The bed is continually rabbled or otherwise agitated to assure constant exposure of new ore surfaces and confined, close and intimate contact thereof with nascent $SO_2$, instant $SO_3$ gas. After a substantial amount of the uranium oxide content of the ore has been sulfatized to form water soluble uranium sulfate, the time period in the second stage is preferably on the order of about 4 to 8 hours.

As was noted above, the roast charge may then be treated to a leaching process, etc., as desired. However, in my preferred process, the charge is then passed to a third stage in which adulterous metallic compounds, such as the iron sulfates described above, are completely decomposed to an insoluble oxide form. The time period in this last stage, as in the other stages, will in any case vary according to the composition and percentage makeup of the ore charge passed through the roaster. However, I have found that a good operating time for the entire process, including the third stage, is about 12 to 24 hours. Thus, the time period in the third stage or bottom zone, as shown in the drawing, is also on the order of about 4 to 8 hours.

As was noted above, in some environments it is desirable to add an alkaline chloride, such as sodium chloride, to the first stage. The sodium chloride in the presence of a reducing agent (the pyrite), and in the presence of heat, serves as an excellent oxidizing agent. It decomposes to evolve chlorine gas which aids in oxidizing the $SO_2$ to instant $SO_3$ gas.

As a typical example, the following will indicate my preferred method of operation using a sodium chloride inclusion. An ore charge was tested and analyzed 2.59% of $U_3O_8$ and about 10% by weight of iron pyrite. To the foregoing, about 2% of NaCl was added, and the mixture then subjected to a treatment similar in all respects to that above described in my preferred method of operation without NaCl. The calcine produced from the foregoing was dissolved in water and analyzed and an extraction of about 94% of the uranium values was obtained.

Repeated testing gave uniformly similar results with, in some instances, even higher extractions. In the preferred practice, when employing both the salt and pyrite addition, and the pyrite addition varying according to the above described conditions, about 1–5% by weight of NaCl may be added.

Having thus described my invention with sufficient particularity and detail to enable one skilled in the art to practice it, what I desire to have protected by Letters Patent is set forth in the following claims.

I claim:

1. A process of treating uranium-containing pitchblende ores containing some anhydrous metallic sulfide which comprises: passing a charge of such a pitchblende ore as a moving bed through at least two heating stages along a confined course under gradually increasing temperatures, said charge containing sufficient anhydrous metallic sulfide to act as a catalyzer during decomposition of the sulfide content, subjecting said bed to a gradually increasing temperature in the first stage sufficient to convert said anhydrous metallic sulfide to an oxide form to thereby aid in evolving $SO_2$ and instant $SO_3$ gas in the bed, directing the evolved gas flow concurrently with said moving bed, subjecting said bed in the second stage to a further gradual temperature increase to slightly above the decomposition temperature of the anhydrous metallic sulfide while continuing to confine evolved and evolving gas in close and intimate contact with ore constituents throughout said bed so as to convert substantially all of the uranium content of said charge to a water soluble sulfate form, and recovering said soluble uranium sulfate from the roast.

2. A process of treating uranium-containing pitchblende ores containing iron pyrite in the amount of about 10% by weight, which comprises passing a charge of such a pitchblende ore as a moving bed through at least two heating stages along a confined course under gradually increasing temperatures, said charge containing sufficient anhydrous metallic sulfide to act as a catalyzer during decomposition of the sulfide content, subjecting said bed to a maximum temperature of about 480° C. in the first stage to convert said iron pyrite to an oxide form inducing evolution of $SO_2$ gas and formation of instant $SO_3$ gas, directing the evolved gas flow concurrently with said moving bed, subjecting said bed in the second stage to a temperature increase to about 600° C. while continuing to confine evolved and evolving $SO_2$ and instant $SO_3$ gas in close and intimate contact with ore constituents throughout said bed so as to convert a substantial amount of the uranium content of said charge to a water soluble sulfate form, and moving the ore charge from the second stage to a water leaching stage in which substantially all of the uranium sulfate is dissolved and separated from residual material of said second stage.

3. A process of treating uranium-containing pitchblende ores containing some anhydrous metallic sulfide which comprises: passing a charge of such a pitchblende ore as a moving bed through at least two heating stages along a confined course under gradually increasing temperatures, said charge containing sufficient anhydrous metallic sulfide to act as a catalyzer during decomposition of the sulfide content, subjecting said bed to a gradually increasing temperature in the first stage sufficient to convert said anhydrous metallic sulfide to an oxide form, and adding some alkaline chloride to thereby aid in evolving $SO_2$ and instant $SO_3$ gas in the bed, directing the evolved gas flow concurrently with said moving bed, subjecting said bed in the second stage to a further gradual temperature increase to slightly above the decomposition temperature of the anhydrous metallic sulfide while continuing to confine evolved and evolving gas in close and intimate contact with ore constituents throughout said bed so as to convert substantially all of the uranium content of said charge to a water soluble sulfate form, and recovering said soluble uranium sulfate from the roast.

4. A process of treating uranium-containing pitchblende ores containing some anhydrous metallic sulfide which comprises: passing a charge of such a pitchblende ore as a moving bed through three heating stages along a confined course under gradually increasing temperatures, said charge containing sufficient anhydrous metallic sulfide to act as a catalyzer during decomposition of the sulfide content, subjecting said bed to a gradually increasing temperature in the first stage to convert said anhydrous metallic sulfide to an oxide form, and adding from 1 to 5% by weight of an alkaline chloride to thereby aid in evolving $SO_2$ and instant $SO_3$ gas in the bed, directing the evolved gas flow concurrently with said moving bed, subjecting said bed in the second stage to a further gradual temperature increase to slightly above the decomposition temperature of the anhydrous metallic sulfide while continuing to confine evolved and evolving gas in close and intimate contact with ore constituents throughout said bed so as to convert a substantial amount of the uranium content of said charge to a water soluble sulfate form, moving the ore charge from the second stage through a third stage with increase in temperature sufficient to form water insoluble oxides of some of the contained impurities of said ore charge, and recovering a soluble uranium sulfate.

5. A process of treating uranium-containing pitchblende ores containing some iron pyrite which comprises: adding a quantity of NaCl to a charge of the ore, passing a charge of such a pitchblende ore as a moving bed through three heating stages along a confined course under gradually increasing temperatures, said charge containing sufficient anhydrous metallic sulfide to act as a catalyzer during decomposition of the sulfide content, subjecting said bed in the first stage to a maximum temperature sufficient to convert said iron pyrite to an oxide form and evolve chlorine gas from said NaCl to thereby evolve $SO_2$ and instant $SO_3$ gas, directing the evolved gas flow concurrently with said moving bed, subjecting said bed in the second stage to a gradual temperature increase to about 600° C. while continuing to confine evolved and evolving gas in close and intimate contact with ore constituents throughout said bed so as to convert substantially all of the uranium content of said charge to a water soluble sulfate form, moving the ore charge from the second stage through a third stage with increase in temperature sufficient to form water insoluble oxides of metallic sulfate impurities contained in said ore charge, and recovering a soluble uranium sulfate.

6. A process of treating uranium-containing pitchblende ores containing some anhydrous metallic sulfide which comprises: passing a charge of such a pitchblende ore as a moving bed through three heating stages along a confined course under gradually increasing temperatures, said charge containing sufficient anhydrous metallic sulfide to act as a catalyzer during decomposition of the sulfide content, subjecting said bed to a maximum temperature in the first stage sufficient to convert said anhydrous metallic sulfide to an oxide form inducing evolution of $SO_2$ and instant $SO_3$ gas in the bed, directing the evolved gas flow concurrently with said moving bed, subjecting said bed in the second stage to a temperature increase to about 600° C. while continuing to confine evolved and evolving gas in close and intimate contact with ore constituents throughout said bed so as to convert a substantial amount of the uranium content of said charge to a water soluble sulfate form, and subjecting the ore charge in the third stage to an increase in temperature to slightly below the decomposition temperature of uranium sulfate so as to form water insoluble oxides of contained impurities of said ore charge.

7. The process of claim 6 in which the anhydrous metallic sulfide is iron pyrite.

8. The process of claim 7 in which the maximum temperature of the first stage is about 480° C.

9. A process of treating uranium-containing pitchblende ores containing some anhydrous metallic sulfide which comprises: passing a charge of such a pitchblende ore as a moving bed through three heating stages along a confined course under gradually increasing temperatures, said charge containing sufficient anhydrous metallic sulfide to act as a catalyzer during decomposition of the sulfide content, subjecting said bed to a maximum temperature in the first stage sufficient to convert said anhydrous metallic sulfide to an oxide form inducing evolution of $SO_2$ and instant $SO_3$ gas in the bed, directing the evolved gas flow concurrently with said moving bed, subjecting said bed in the second stage to a temperature increase to about 600° C. while continuing to confine evolved and evolving gas in close and intimate contact with ore constituents throughout said bed so as to convert a substantial amount of the uranium content of said charge to a water soluble sulfate form, subjecting the ore charge in the third stage to an increase in temperature to slightly below the decomposition temperature of uranium sulfate so as to form water insoluble oxides of contained impurities of said ore charge, and recovering a soluble uranium sulfate.

10. A process of treating uranium-containing pitchblende ores containing some anhydrous metallic sulfide which comprises: passing a charge of such a pitchblende ore as a moving bed through three heating stages along a confined course under gradually increasing temperatures, said charge containing sufficient anhydrous metallic sulfide to act as a catalyzer during decomposition of the sulfide content, subjecting said bed to a maximum temperature in the first stage sufficient to convert said anhydrous metallic sulfide to an oxide form inducing evolution of $SO_2$ and instant $SO_3$ gas in the bed, directing the evolved gas flow concurrently with said moving bed, subjecting said bed in the second stage to a temperature increase to about 600° C. while continuing to confine evolved and evolving gas in close and intimate contact with ore constituents throughout said bed so as to convert a substantial amount of the uranium content of said charge to a water soluble sulfate form, subjecting the ore charge in the third stage to an increase in temperature to slightly below the decomposition temperature of uranium sulfate so as to form water insoluble oxides of contained impurities of said ore charge, and moving the ore charge from said third stage to a water leaching stage in which substantially all of the uranium sulfate is dissolved and the insoluble oxides of impurities are passed out with the residual material from said leaching treatment.

11. A process of treating uranium-containing pitchblende ores containing a quantity of iron pyrite which comprises: adding sufficient iron pyrite to amount to about 10% by weight, passing a charge of such a pitchblende ore as a moving bed through three heating stages along a confined course under gradually increasing temperatures, said charge containing sufficient anhydrous metallic sulfide to act as a catalyzer during decomposition of the sulfide content, subjecting said bed to an increasing temperature of from about 167° to about 480° C. in the first stage to convert said iron pyrite to a catalytically active oxide form, evolving $SO_2$ and instant $SO_3$ gas, directing the evolved gas flow concurrently with said moving bed, subjecting said bed in a second stage to a temperature increase to slightly above the decomposition temperature of the iron pyrite while continuing to confine evolved and evolving gas in close and intimate contact with ore constituents throughout the said bed so as to convert a substantial amount of the uranium content of said charge to a water soluble sulfate form, moving the ore charge from the second stage through a third stage with increase in temperature sufficient to form water insoluble oxides of contained impurities of said ore charge, and recovering a soluble uranium sulfate.

12. A process of treating uranium-containing pitchblende ores, which comprises subjecting a charge of such a pitchblende ore containing sufficient iron pyrite to amount to about 10% by weight of the ore mixture to a sulfatizing roast at gradually increasing temperatures to a maximum of approximately 600° C. in a succession of confined treatment zones, directing said charge through said zones in concurrent flow with the gas of the treatment, confining evolved $SO_2$ and nascent $SO_3$ gas in close and intimate contact with the ore charge moving in concurrent flow therewith through said succession of zones, directing gas in its nascent state in close and intimate contact with exposed surfaces of said ore charge in said concurrent flow so as to form soluble uranium sulfate and convert other metallic constituents to insoluble oxides, and recovering uranium in soluble sulfate form from said roasted charge.

13. The process of roasting uranium pitchblende ores containing iron pyrites, which comprises subjecting such an ore charge containing sufficient anhydrous metallic sulfide to act as a catalyzer during decomposition of the sulfide content to a sulfatizing roast in a succession of spaced, confined treatment zones through which the charge passes in a gravity flow and evolved $SO_2$ and nascent $SO_3$ gas is confined and directed in close and intimate contact with the surfaces of the ore charge for continuous gas-solids contact and successive exposure of new ore surfaces during progressive concurrent movement of the ore charge and gas through the roasting zones, including the steps of mixing 1 to 5% by weight of NaCl with the ore charge before roasting, and subjecting said ore charge to movement in a bed at gradually increasing temperatures to a maximum at about the decomposition temperature of the iron pyrites during said progressive gravity flow whereby to evolve $SO_2$ and instant $SO_3$ gas in the bed during the progress of such flow and thereby form soluble uranium sulfate while converting other metallic constituents to insoluble oxides, and recovering uranium in soluble sulfate form from said roasted charge.

14. The process of roasting uranium pitchblende ores containing sufficient iron pyrites to amount to about 10% by weight, which comprises subjecting such an ore charge to a sulfatizing roast in a succession of vertically-spaced, confined treatment zones through which the charge is passed in a gravity flow and evolved nascent $SO_2$ gas is directed in close and intimate contact with the surfaces of the ore charge for continuous gas-solids contact and successive exposure of new ore surfaces to the gas during progressive concurrent movement of said gas and ore charge through the roasting zones, including the steps of mixing 1 to 5% by weight of NaCl with the ore charge prior to roasting, and subjecting said mixture to movement in a bed at gradually increasing temperatures during said progressive gravity flow of said material to a maximum of about 600° C., whereby to evolve $SO_2$ and instant $SO_3$ gas in the bed during the progress of such flow and thereby form soluble uranium sulfate while converting other metallic constituents to insoluble oxides, and recovering uranium in soluble sulfate form from said roasted charge.

15. A process of treating uranium-containing pitchblende ores containing some anhydrous metallic sulfide, which comprises passing a charge of such a pitchblende ore as a moving bed through three heating stages along a confined course under gradually increasing temperatures, said charge containing sufficient anhydrous metallic sulfide to act as a catalyzer during decomposition of the sulfide content, subjecting said bed to increasing temperature to a maximum of about 480° C. in from 4 to 8 hours in the first stage so as to convert anhydrous metallic sulfide to an oxide form, directing evolved and evolving gas in contacting, concurrent flow with said bed through the three stages, subjecting said bed in the second stage to another gradual temperature increase to a maximum slightly above the decomposition temperature of the anhydrous metallic sulfide in from 4 to 8 hours so as to convert a substantial amount of the uranium content to a water soluble sulfate form, subjecting said bed in the third stage to another temperature increase to a maximum above the decomposition temperature of iron sulfates in from 4 to 8 hours so as to form water insoluble oxides of metallic sulfate impurities contained in the bed, and recovering a soluble uranium sulfate.

16. A roasting process for uranium-containing pitchblende ores, which comprises passing a charge of such an ore through a confined roasting zone, said ore containing sufficient anhydrous metallic sulfide to act as a catalyzer during decomposition of the sulfide content, heating the entering ore charge under gradually increasing temperature in the presence of air to a maximum of about 480° C. in a first stage of the treatment, thereby causing at least a partial decomposition of the sulfide and evolution of instant $SO_3$ throughout the depth of the bed, rabbling the bed of ore throughout its passage through the confined zone so as to promote instant $SO_3$ evolution in the bed, directing evolved and evolving gas in concurrent flow with the ore through the confined zone, subjecting said bed in a second stage of the confined zone to another gradual increase in temperature to about 600° C. for completing the conversion of the uranium constituents to water soluble sulfates and decomposition of adulterous metallic constituents to insoluble oxide by continued evolution of instant $SO_3$ in the bed, introducing sufficient oxygen into the confined zone during the gradual temperature increase to react with free sulfur in the bed in an exothermic reaction, and recovering soluble uranium sulfate from the residual solids discharge at the completion of the roasting treatment.

References Cited in the file of this patent

UNITED STATES PATENTS

| | | |
|---|---|---|
| 1,063,629 | Wedge | June 3, 1913 |
| 1,582,347 | Read et al. | Apr. 27, 1926 |
| 1,644,692 | Read et al. | Oct. 11, 1927 |
| 1,749,125 | Brinker | Mar. 4, 1930 |

OTHER REFERENCES

Bearse et al.: BMI–JDS–130, June 30, 1948 (declassified March 5, 1956), pp. 16–21, 55–64.

Richardson et al.: BMI–JDS–195, June 30, 1949, pp. 21–26.

Perry: "Chemical Engineers Handbook," 3rd Ed. (1950), pp. 1622, 1623, McGraw-Hill Book Co., N.Y.C.

Katz et al.: "Chemistry of Uranium," 1st Ed., pp. 111, 112, 113, 131, 132 (1951).

Djingheuzian: "Trans. Can. Inst. Min. and Met.," vol. 55, pp. 228–240 (1952).